Aug. 11, 1953   L. G. CROOK   2,648,474
AIR EXTRACTOR
Filed Oct. 9, 1951
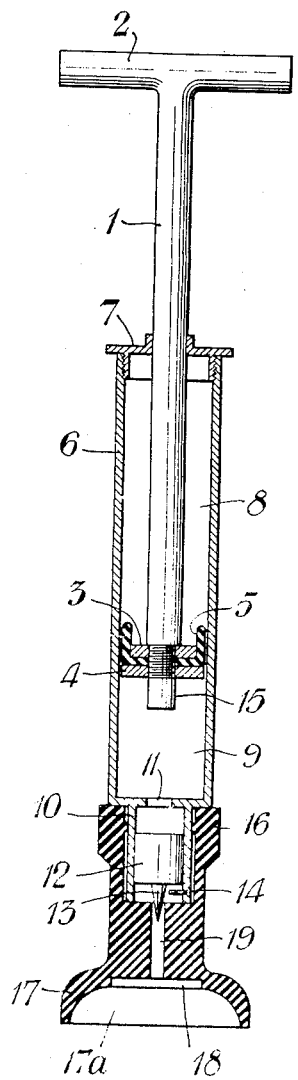
INVENTOR:
LESLIE GEORGE CROOK
BY:

Patented Aug. 11, 1953

2,648,474

UNITED STATES PATENT OFFICE 2,648,474

AIR EXTRACTOR

Leslie George Crook, Camberley, England

Application October 9, 1951, Serial No. 250,411
In Great Britain January 4, 1950

1 Claim. (Cl. 226—20.4)

The present invention relates to air extractors, and more particularly to portable hand pumps for extracting air from containers prior to sealing the same and has for an object to provide improvements in the construction of such devices.

A feature of the present invention is the incorporation in a pump of means for puncturing a container prior to extracting air therefrom by means of the pump and sealing the container.

One embodiment of the invention will now be described with reference to the accompanying drawing, which shows a partly sectional side elevation of a device according to the invention.

Referring to the drawing, a piston rod 1, formed with a handle 2, carries between washers 3 and 4, screwthreaded thereon, a bucket 5 of leather or other suitable substance. Said rod 1 is reciprocable within a cylindrical casing 6, and guided by an apertured top 7, screwthreaded into said casing 6. A slight clearance is allowed between the inner walls of the casing 6 on the one hand, and the periphery of washer 4 and the outer walls of bucket 5 on the other hand, so that when the rod 1 is withdrawn from the casing 6 the walls of bucket 5 are pressed by the air in space 8 against the inner walls of the casing 6, further withdrawal of rod 1 serving to expel said air through the aperture in top 7, whilst when the rod 1 is forced further into casing 6, air in space 9 may pass into space 8 via the clearance above mentioned.

Casing 1 is formed at its lower end with a cylindrical extension 10, open at its lower end, and whose interior communicates with space 9 through aperture 11. Slidable freely within said extension 10 is a punch comprising a cylindrical body 12 and a pointed portion 13, said punch being retained within extension 10 by a set screw 14. Aperture 11 is of such dimensions as to allow lower end 15 of rod 1 to pass freely therethrough, and said lower end 15 is sufficiently long as to enable it to engage and depress punch body 12 to the lower limit of its travel when handle 2 is depressed.

Mountable frictionally upon said extension 10 is a detachable pad 16 of rubber or other suitable material, formed with a somewhat resilient cup-shaped portion 17, a mouth 17a, a circular recess 18, and a bore 19.

The device is operated as follows. A hole is first pierced in the required container by removing pad 17 from the pump, raising handle 2, placing the lower edge of extension 10 in the required position on the container, and depressing handle 2 sharply, for example by means of a blow with the palm of the hand. Rod end 15 then engages the body 12 of the punch, and compels pointed portion 13 to puncture the container. The pump is then removed from the container, and a sealing patch of suitable material such as rubber placed over the hole therein.

Pad 16 is then affixed to extension 10, and the mouth 17a of the pad placed over the sealing patch, handle 2 having previously been fully depressed. Upon raising said handle, the suction caused lifts said sealing patch, and air is extracted from the container to pass through bore 19, between punch body 12 and the walls of extension 10, through aperture 11, into space 9. The assembly of pump and pad is then removed from the container, whereupon the pressure of the atmosphere forces the sealing pad against the container, thus effectively sealing the hole therein.

What I claim is:

A combined puncturing device and air extractor for puncturing containers and extracting air therefrom comprising a casing forming a pump cylinder, a piston reciprocably mounted in said cylinder, a piston rod secured to said piston and slidably supported in a closure member at one end of said cylinder, an aperture in the other end of the casing communicating with the interior cylinder, an open mouthed extension member secured to the said other end of casing surrounding the said aperture and adaptor to support the casing upon a container, a punch slidably mounted in said extension member for sliding movement axially of the casing and having a pointed portion adapted to be extended outwardly from the mouth of said extension member and to be retracted therefrom, movement of the piston rod in one direction towards the said other end of the cylinder being effective to engage the punch to move the pointed portion to the extended position to puncture the container, and a member adapted to be detachably secured to said extension member and engage the surface of the punctured container to provide a sealed connection between the interior of the punctured container and the pump cylinder, whereby movement of the piston rod in the other direction is effective to draw air from the container into the cylinder.

LESLIE GEORGE CROOK.

References Cited in the file of this patent

UNITED STATES PATENTS

| Number | Name | Date |
|---|---|---|
| 1,632,933 | Thornton | June 21, 1927 |
| 1,847,189 | Lindstrom | Mar. 1, 1932 |
| 2,349,588 | Brand | May 23, 1944 |
| 2,436,849 | Billetter | Mar. 2, 1948 |